(12) United States Patent
Ikunami

(10) Patent No.: US 6,283,417 B1
(45) Date of Patent: Sep. 4, 2001

(54) CAR AUDIO FIXING DEVICE

(75) Inventor: Takahiro Ikunami, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/402,376

(22) PCT Filed: May 27, 1998

(86) PCT No.: PCT/JP98/02337

§ 371 Date: Oct. 4, 1999

§ 102(e) Date: Oct. 4, 1999

(87) PCT Pub. No.: WO99/61280

PCT Pub. Date: Dec. 2, 1999

(51) Int. Cl.$^7$ .................................................. E12B 9/00
(52) U.S. Cl. ................................................... 248/27.3
(58) Field of Search .................... 248/27.3, 27.1

(56) References Cited

U.S. PATENT DOCUMENTS

| | | | |
|---|---|---|---|
| 4,784,357 | * | 11/1988 | Kimura ................................. 248/27.1 |
| 4,895,326 | * | 1/1990 | Nimpoeno et al. ................. 248/27.1 |
| 4,993,668 | * | 2/1991 | Inamura ........................... 248/27.1 X |
| 5,467,947 | * | 11/1995 | Quilling, II ........................ 248/27.1 |

FOREIGN PATENT DOCUMENTS

| | | |
|---|---|---|
| 56-143885 | 3/1955 | (JP) . |
| 58-49303 | 4/1983 | (JP) . |
| 58-122481 | 8/1983 | (JP) . |
| 61-153378 | 9/1986 | (JP) . |
| 62-80437 | 5/1987 | (JP) . |
| 3-124964 | 12/1991 | (JP) . |
| 4-50544 | 4/1992 | (JP) . |
| 4-100943 | 9/1992 | (JP) . |

* cited by examiner

*Primary Examiner*—Ramon O. Ramirez
(74) *Attorney, Agent, or Firm*—Sughrue, Mion, Zinn, Macpeak & Seas, PLLC

(57) ABSTRACT

Mounting device bodies 4 secured to both side faces of a car audio 2 and fitted into a vehicular audio mounting hole 1 together with the car audio are each provided with vertical positioning mechanisms 13 and 14 for positioning and fixing the car audio 2 vertically with respect to the audio mounting hole 1. Consequently, with only one kind of mounting device body 4, without requiring the use of any other separate component, the car audio 2 can be vertically positioned and fixed accurately with respect to the audio mounting hole 1, and thus car audio mounting accuracy is improved.

4 Claims, 12 Drawing Sheets

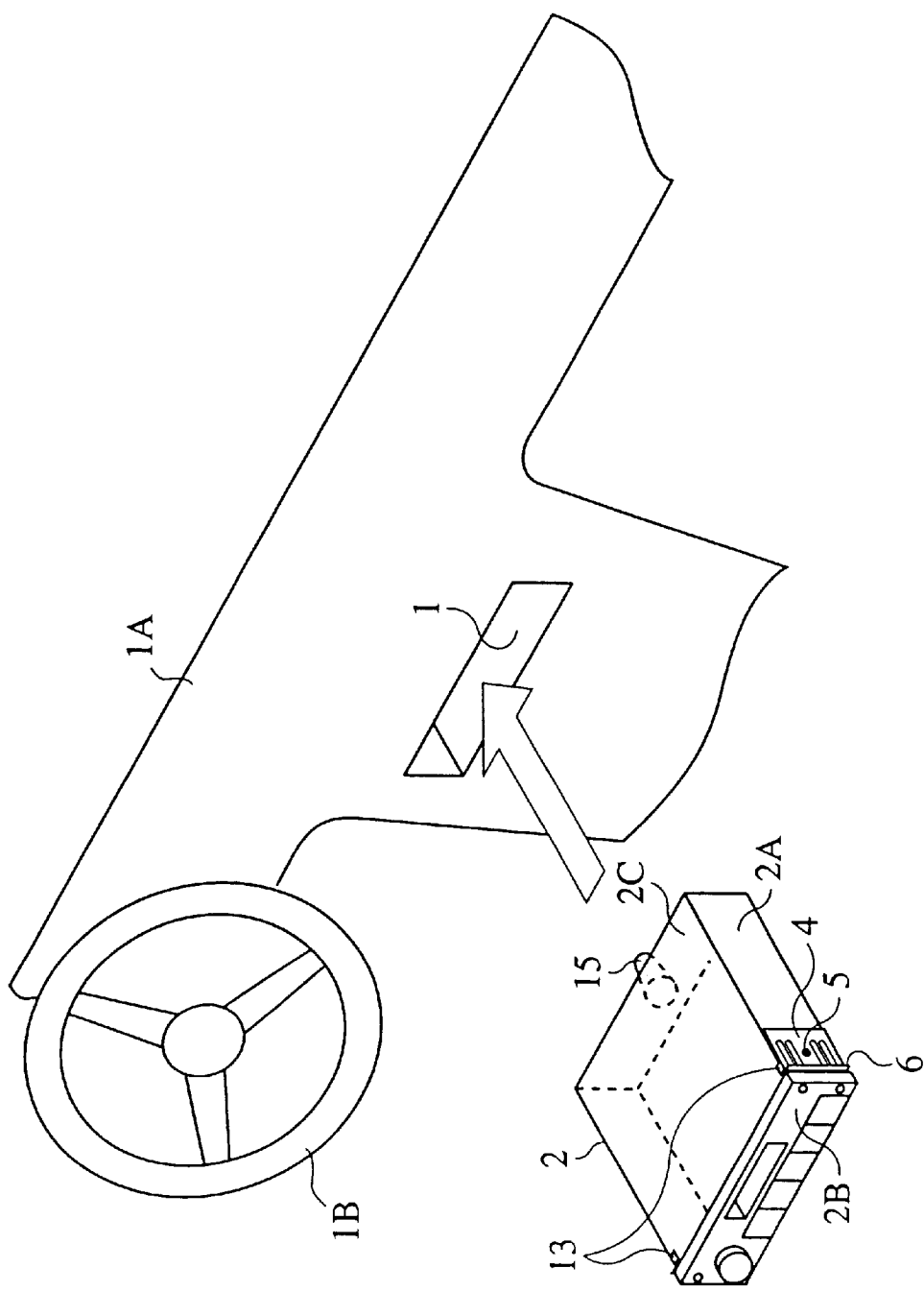

CAR AUDIO FIXING DEVICE

TECHNICAL FIELD

The present invention relates to a car audio mounting device for positioning and fixing a car audio into an audio mounting hole formed in a vehicle. Particularly, the invention is concerned with a car audio mounting device which is attached to both side faces of a car audio and which is to be fitted into a vehicular audio mounting hole together with the car audio.

BACKGROUND ART

Conventional methods of fitting and setting a car audio into a vehicular audio mounting hole have entailed the use of mounting strips which are attached beforehand to both right and left side faces of the car audio. When the car audio is fitted into the audio mounting hole, the mounting strips are brought into engagement with the audio mounting hole, and the car audio is positioned and fixed into the audio mounting hole.

FIG. 1 is a perspective view showing a car audio in relation to an audio mounting hole formed in a vehicle, with a conventional car audio mounting device being attached to the car, and FIG. 2 is an enlarged perspective view of the car audio shown in FIG. 1. In these figures, the reference numeral 1A denotes an instrument panel of a vehicle (automobile), numeral 1B denotes a steering handle, numeral 1 denotes a rectangular audio mounting hole formed in the instrument panel 1A, and numeral 2 denotes a car audio to be fitted and set into the audio mounting hole 1. The car audio 2 is constituted by a combination of a chassis 2A in the shape of an open top type case and a chassis 2C for covering the chassis 2A from above, the chassis 2A having an operating panel 2B as a front panel. The chassis 2A and 2C are formed by thin metallic plates.

Numeral 3 denotes a convex lug formed plurally on the front upper portion of the cover chassis 2C. Likewise, downwardly convex lugs 3 (see FIG. 4 to be referred to later) are formed on the front lower portion of the case-like chassis 2A.

Numeral 4 denotes a car audio mounting member (hereinafter referred to also as "mounting device body") attached and fixed in face-to-face contact to the front portion of both the right and left side faces of the car audio 1. Numeral 5 denotes a bolt which tightens and fixes the mounting device body 4 to the car audio 1.

FIG. 3 illustrates the car audio mounting device shown in FIGS. 1 and 2, in which (a) is a side view, (b) is a front end view of (a), and (c) is a top view of (a).

In FIG. 3, the numeral 4 denotes a plate-like mounting device body constituted by a rigid metallic plate such as a stainless steel plate; numeral 6 denotes a bent front-end engaging piece formed by bending the front end of the mounting device body 4 in a direction perpendicular thereto; numeral 7 denotes two elastically deformable cut-in pieces formed by cutting in the web portion of the mounting device body 4; numeral 8 denotes an engaging pawl formed by bending the front end of the cut-in piece 7, the engaging pawl 8 projecting in the same direction as the direction of the bend of the bent front-end engaging piece 6; and numeral 9 denotes a bolt insertion hole formed in the mounting device body 4.

FIG. 4 is a side view in vertical section of the car audio as loaded into the audio mounting hole shown in FIG. 1. FIG. 5 is a plan view in cross section of FIG. 4. In these figures, the audio mounting hole 1 comprises an outer large-diameter opening 1a and an inner small-diameter opening 1b.

The operation will now be explained.

First, two mounting device bodies 4 formed as above are tightened and fixed with bolts 5 to both side faces of the chassis 2A of the car audio 2 so that the respective bent front-end engaging pieces 6 face outward.

When the car audio 2, with two mounting device bodies 4 thus fixed to both sides thereof, is fitted in the vehicular audio mounting hole 1, the side in the direction of insertion of the bent front-end engaging pieces 6 of the mounting device bodies 4 comes into abutment with the stepped front walls of the small-diameter opening 1b of the audio mounting hole 1, as shown in FIG. 5, whereupon the front ends of the bent front-end engaging pieces 6 are held in an abutted state against the right and left inner wall surfaces of the 1a large-diameter opening 1a of the audio mounting hole 1. At the same time, the engaging pawls 8 of the mounting device bodies 4 come into engagement with inner opening ends of the small-diameter opening 1b of the audio mounting hole 1. Further, as shown in FIG. 4, the upper and lower lugs 3 of the car audio 2 abut and match the upper and lower inner wall surfaces of the small-diameter opening 1b of the audio mounting hole 1.

Therefore, when the car audio 2 is fitted into the audio mounting hole 1, the front ends of the bent front-end engaging pieces 6 of the mounting device bodies 4 come into abutment with the right and left inner wall surfaces of the large-diameter opening 1a of the audio mounting hole 1, and thus the bent front-end engaging pieces 6 function as transverse positioning mechanisms which inhibit transverse movements of the car audio 2. The convex lugs 3 formed on the upper and lower chassis 2C, 2A of the car audio 2 come into abutment with the upper and lower inner wall surfaces of the small-diameter opening 1b of the audio mounting hole 1, thus the convex lugs 3 function as vertical positioning mechanisms which inhibit vertical movements of the car audio 2. Further, the engaging pawls 8 of the mounting device bodies 4 are engaged with inner opening ends of the small-diameter opening 1b of the audio mounting hole 1, so that the engaging pawls 8 function as inward positioning mechanisms which inhibit an inward movement of the car audio 2.

Since the conventional car audio mounting device is constructed as above, it is possible to satisfactorily effect positioning and fixing in the transverse direction of the car audio 2 by the bent front-end engaging pieces 6 of the mounting device bodies 1. Positioning and fixing in the inward direction of the car audio is effected by the engaging pawls 8 of the mounting device bodies 1. However, the problem has arisen that the positioning and fixing of the car audio 3 in the vertical direction by the lugs 3 formed on the chassis 2A and 2C of the car audio 2 are insufficiently strong. In more particular terms, since the chassis of the car audio 2 comprises separate, upper and lower chassis 2A, 2C and especially since the chassis 2C, serving as a cover member, is formed by a thin metallic plate, the chassis 2C is deflected easily and hence an error in the vertical direction is apt to occur at the time of mounting the car audio 2 relative to the audio mounting hole 1. That is to say, it is difficult to obtain vertical dimensional accuracy in mounting the car audio.

Moreover, since the convex lugs 3 are formed on the chassis 2C, it is necessary to design such lugs 3 for each type of audio system and therefore the freedom as regards design is reduced.

FIG. 6 is a perspective view showing an auxiliary mounting device in relation to the car audio and the vehicular audio mounting hole, the auxiliary mounting device being used in combination with the conventional audio mounting device described above. FIG. 7 is a sectional view showing the car audio shown in FIG. 6 as loaded into the vehicular audio mounting hole. In these figures, the numeral 10 denotes an auxiliary mounting device which is in the shape of a rectangular frame being fitted on the outside of the car audio 2, and numeral 11 denotes a convex lug formed plurally on both upper and lower surfaces of the auxiliary mounting device 10. The lugs 11 substitute the lugs 3 of the chassis 2A and 2C shown in FIGS. 1, 2 and 4. Numeral 12 denotes a window hole formed in both side walls of the auxiliary mounting device 10. The window holes 12 are for allowing the engaging pawls 8 of the mounting device bodies 4 shown in FIGS. 3 to 5 to project therethrough. In FIGS. 6 and 7, identical components to those shown in FIGS. 1 to 5 are identified by like reference numerals.

The operation will now be explained.

Firstly, the auxiliary mounting device 10, which is different from the mounting device bodies 4 shown in FIGS. 1 to 5, is fitted on a car audio 2 with the mounting device bodies 4 attached on both sides thereto, and the engaging pawls 8 of the mounting device bodies 4 are allowed to project from the window holes 12 of the auxiliary mounting device 10 to fix the auxiliary mounting device 10 beforehand to the car audio 2.

Thus, by inserting the car audio 2 with both mounting device bodies 4 and auxiliary mounting device 10 attached thereto into the vehicular audio mounting hole 1, the car audio 2 is positioned and fixed in both transverse and inward directions by the mounting device bodies 4 in the same manner as that mentioned in connection with FIGS. 1 to 5. At the same time, the upper and lower lugs 11 of the auxiliary mounting device 10 come into pressure contact with the upper and lower inner wall surfaces of the audio mounting hole 1, so that the car audio 2 is positioned and fixed in the vertical direction by the auxiliary mounting device 10.

The conventional auxiliary car audio mounting device, which is constructed as above, is a separate component of a different type, for example different in shape, from the mounting device bodies 4 attached to both sides of the car audio 2, thus giving rise to the problem that the number of components used increases, the car audio mounting operation requires more labor and time, and the cost increases.

The present invention is proposed for the purpose of solving the above-mentioned problem. It is an object of the invention to provide a car audio mounting device capable of positioning and fixing a car audio into a vehicular audio mounting hole, the device having sufficient strength in the vertical direction and using only one kind of component.

It is another object of the present invention to provide a car audio mounting device easy to mold and capable of attaining a reduction in costs.

It is a still further object of the present invention to provide a car audio mounting device capable of being easily inserted into a vehicular audio mounting hole together with a car audio while affording a sufficient positioning strength after the insertion.

It is a still further object of the present invention to provide a car audio mounting device applicable to different audio systems through the use of only one kind of component, hence allowing greater design freedom.

DISCLOSURE OF INVENTION

The car audio mounting device according to the present invention is for the purpose of positioning and fixing a car audio into an audio mounting hole formed in a vehicle. The car audio mounting device is provided with mounting device bodies secured to both right and left sides of the car audio and vertical positioning mechanisms provided respectively in the mounting device bodies to position and fix the car audio vertically with respect to the audio mounting hole at the time of inserting the car audio into the audio mounting hole.

According to this car audio mounting device, vertical positioning mechanisms for positioning and fixing the car audio vertically with respect to the vehicular audio mounting hole are provided respectively in the mounting device bodies to be fitted in the audio mounting hole together with the car audio. Therefore in comparison with the conventional car audio mounting device having convex lugs on both upper and lower chassis of a car audio, there is no possibility that an error may occur due to, for example, deflection of the chassis at the time of vertical positioning and fixing of the car audio. Furthermore, the use of a single kind of component, without requiring the use of any other component, enables car audio positioning accuracy to be ensured in the vertical direction.

The vertical positioning mechanisms in the car audio mounting device according to the present invention each comprise bent upper and lower engaging pieces which are bent respectively at the upper and lower ends of each plate-like mounting device body secured in face-to-face contact to a side face of a car audio, the upper and lower engaging pieces projecting in a direction along the upper and lower surfaces of the car audio respectively from the upper and lower ends of the mounting device body, the upper and lower engaging pieces coming into pressure engagement respectively with the upper and lower inner wall surfaces of the audio mounting hole.

When the car audio is inserted into the audio mounting hole using such a vertical positioning mechanism, it is possible to attain a reduction in costs because the plate-like mounting device body can be easily formed by bending.

The audio mounting device according to the present invention is provided with guide mechanisms for vertically guiding the mounting device bodies up to predetermined positions with respect to the audio mounting hole at the time of insertion of a car audio into the same hole.

According to this audio mounting device, the insertion of the car audio into the vehicular audio mounting hole can be easily carried out.

The guide mechanisms in the car audio mounting device according to the present invention each comprise tapered side portions formed respectively on the upper and lower sides of each plate-like mounting device body which is secured in face-to-face contact to a side face of the car audio.

Such a guide mechanism permits a reduction in costs because it can be formed easily in a single plate-like mounting device body without requiring another separate component.

According to this car audio mounting device, a device formed easily by machining only one kind of component can be applied to different audio systems, thus improving design freedom.

BRIEF DESCRIPTION OF DRAWINGS

FIG. 8 is a perspective view showing a car audio in relation to a vehicular audio mounting hole, with a car audio mounting device according to Embodiment 1 of the present invention being attached to the car audio;

BEST MODE FOR CARRYING OUT THE INVENTION

In order to explain the present invention in more detail, the best mode for carrying out the invention will be described below with reference to the accompanying drawings.

Embodiment 1

Figure 1:
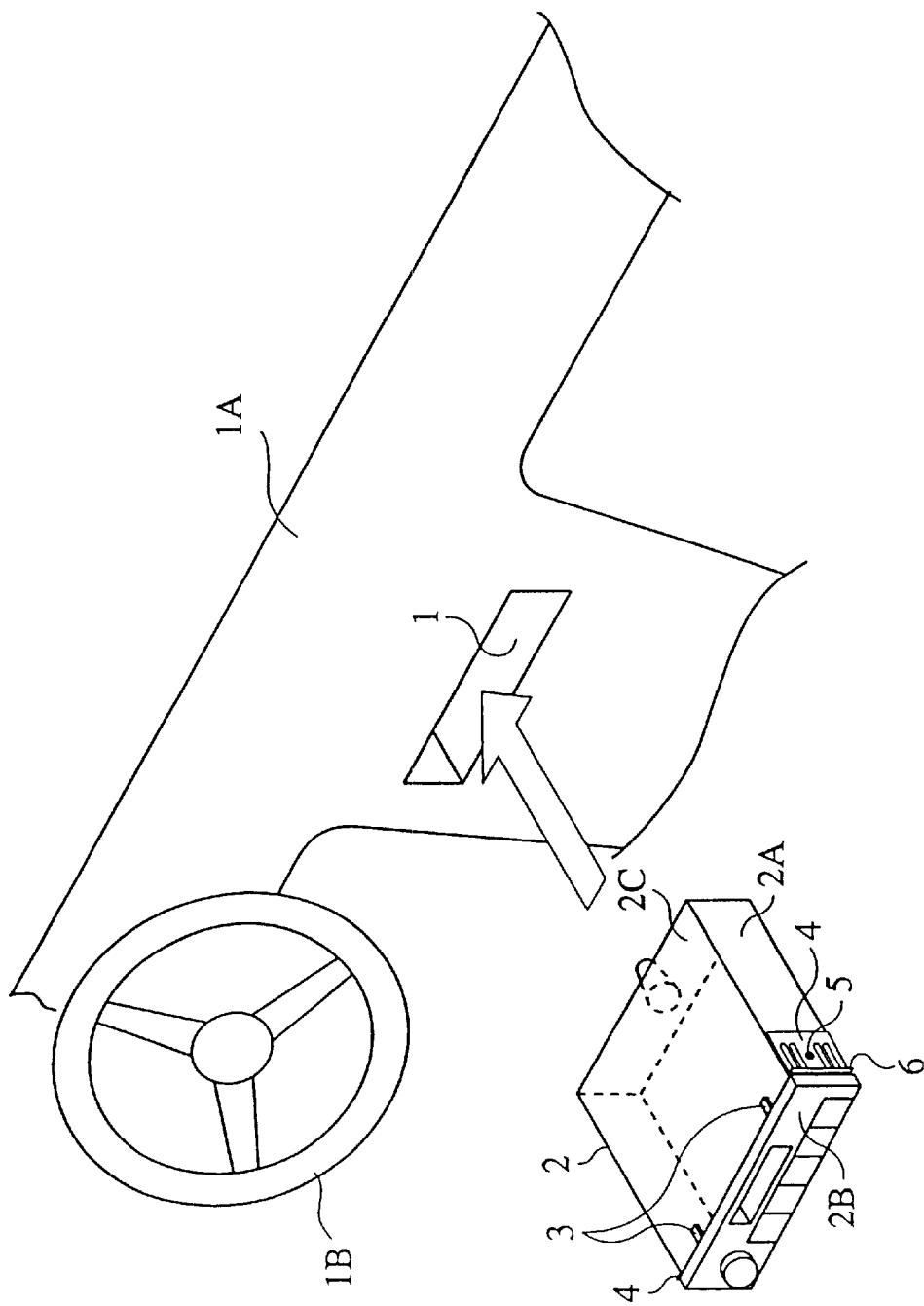
FIG. 1 is a perspective view showing a car audio in relation to an audio mounting hole formed in a vehicle, with a conventional car audio mounting device being attached to the car audio.
Figure 2:
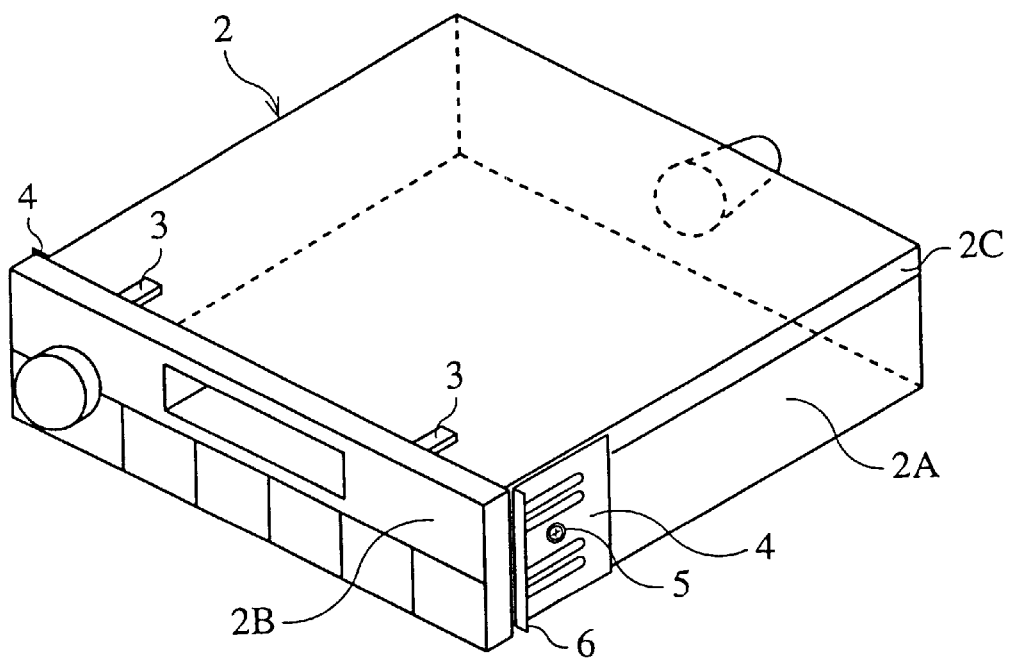
FIG. 2 is an enlarged perspective view of the car audio shown in FIG. 1.
Figure 3C:
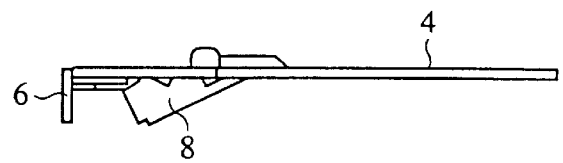
FIG. 3 illustrates the car audio mounting device shown in FIGS. 1 and 2, in which (a) is a side view, (b) is a front end view of (a), and (c) is a top end view of (a)
Figure 3B:
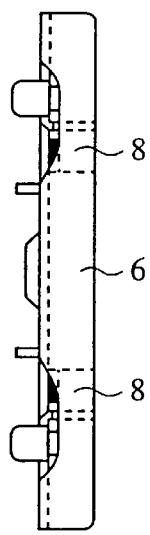
Figure 3A:
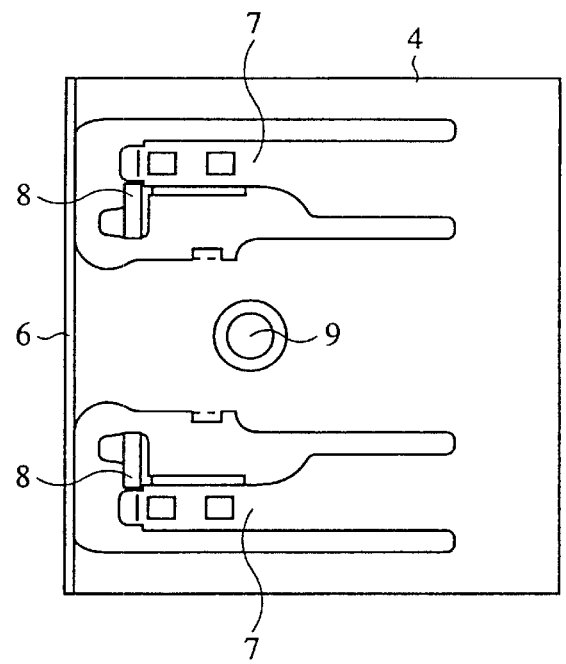
Figure 4:
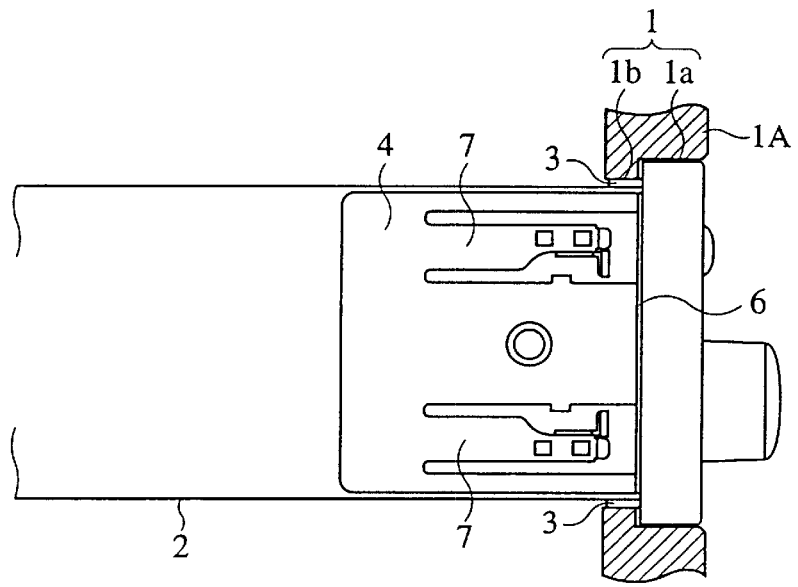
FIG. 4 is a side view in vertical section showing the car audio as loaded into the audio mounting hole shown in FIG. 1.
Figure 7:
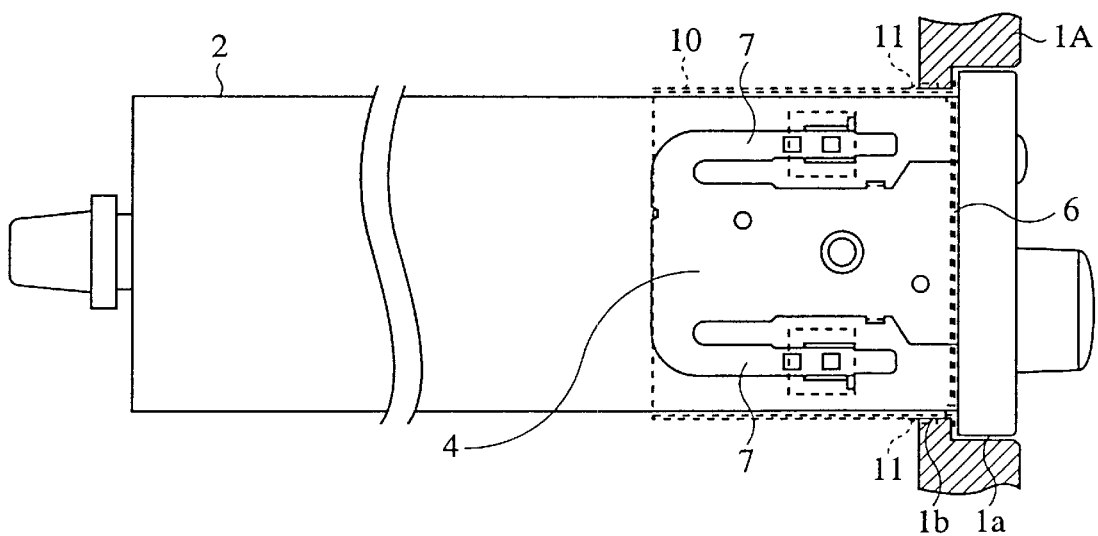
FIG. 7 is a sectional view showing the car audio shown in FIG. 6 as loaded into the vehicular audio mounting hole.
Figure 5:
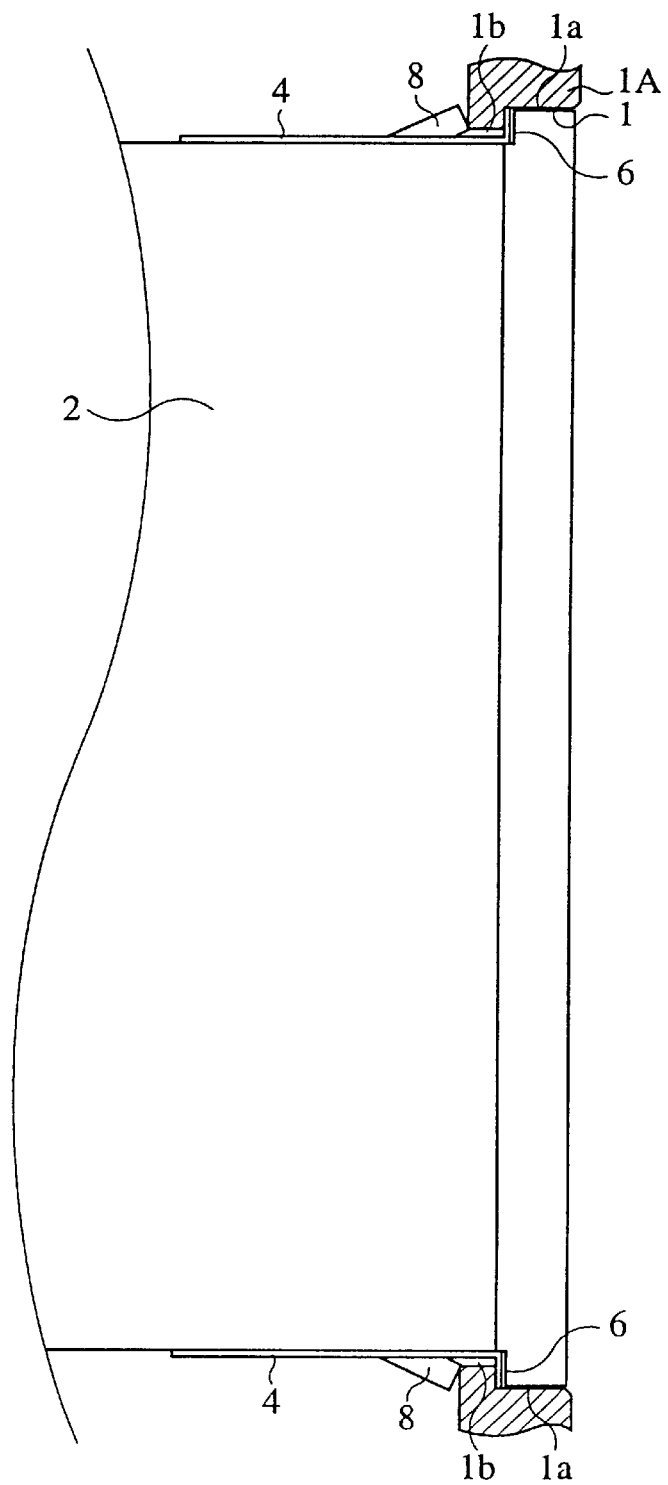
FIG. 5 is a plan view in cross section of FIG. 4.
Figure 6:
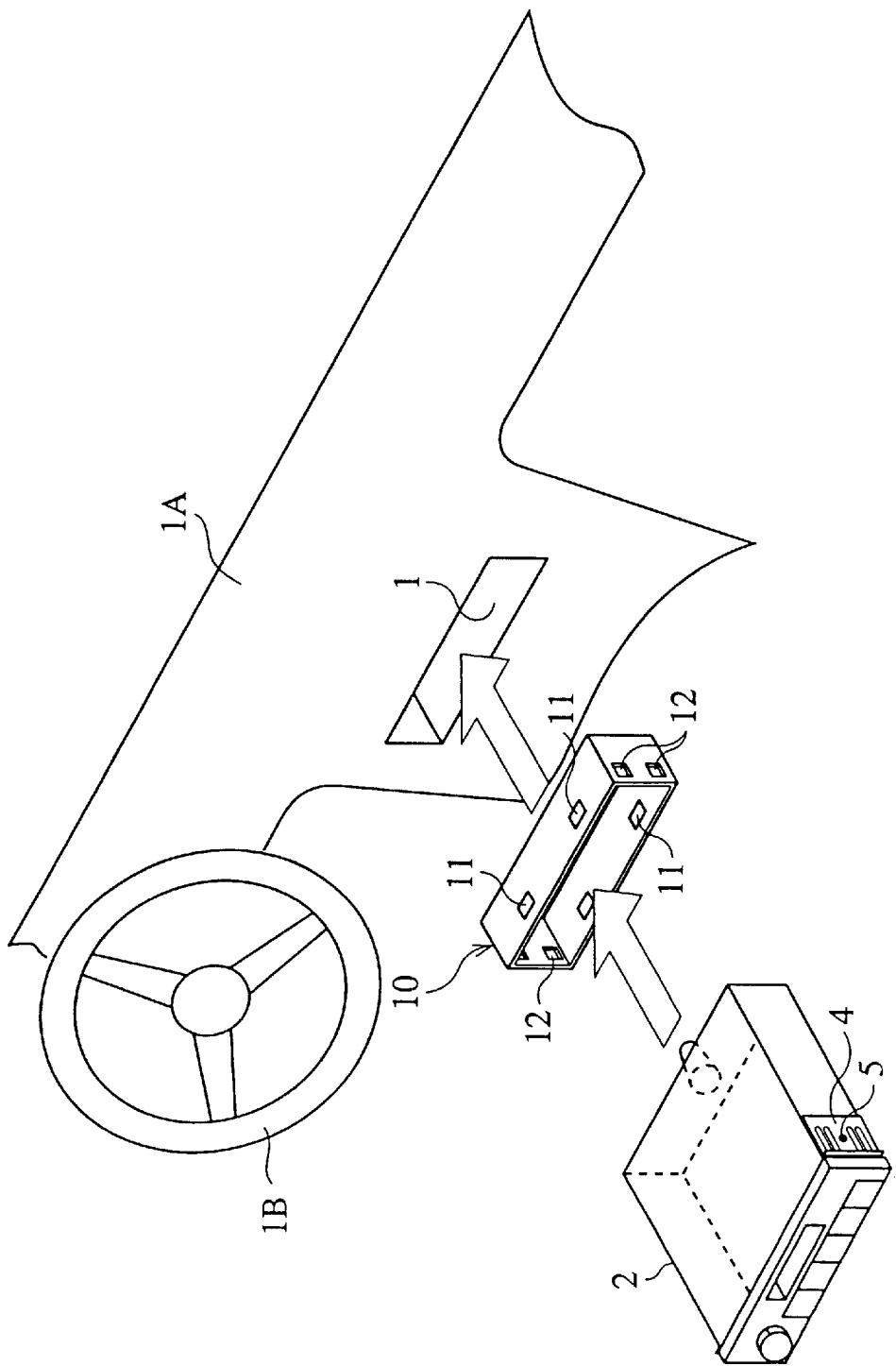
FIG. 6 is a perspective view showing an auxiliary mounting device in relation to both car audio and vehicular audio mounting hole, the auxiliary mounting device being used in combination with the conventional car audio mounting device.
Figure 9:
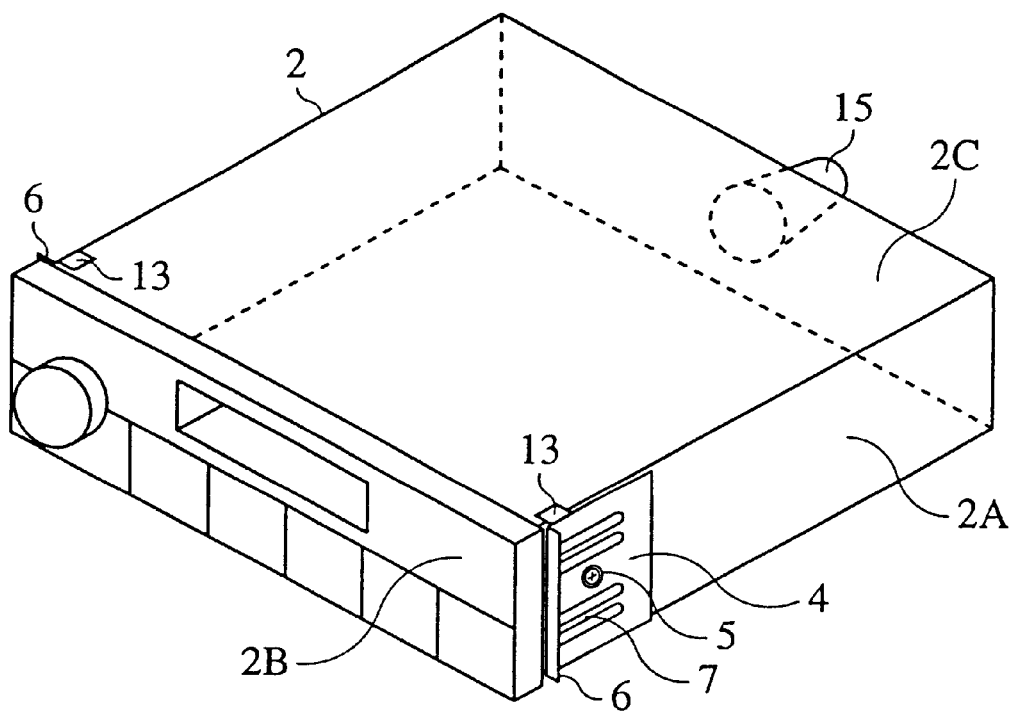
FIG. 9 is an enlarged perspective view of the car audio shown in FIG. 8.
Figure 10C:
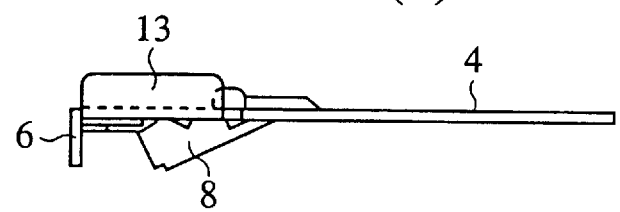
FIG. 10 illustrates the car audio mounting device shown in FIGS. 8 and 9 in which (a) is a side view, (b) is a front end view of (a), and (c) is a top end view of (a)
Figure 10B:
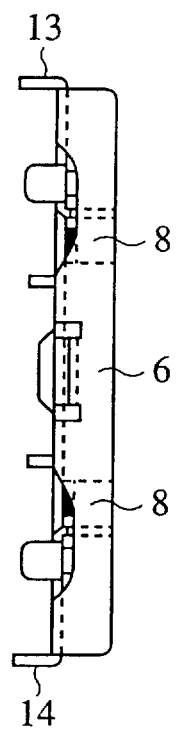
Figure 10A:
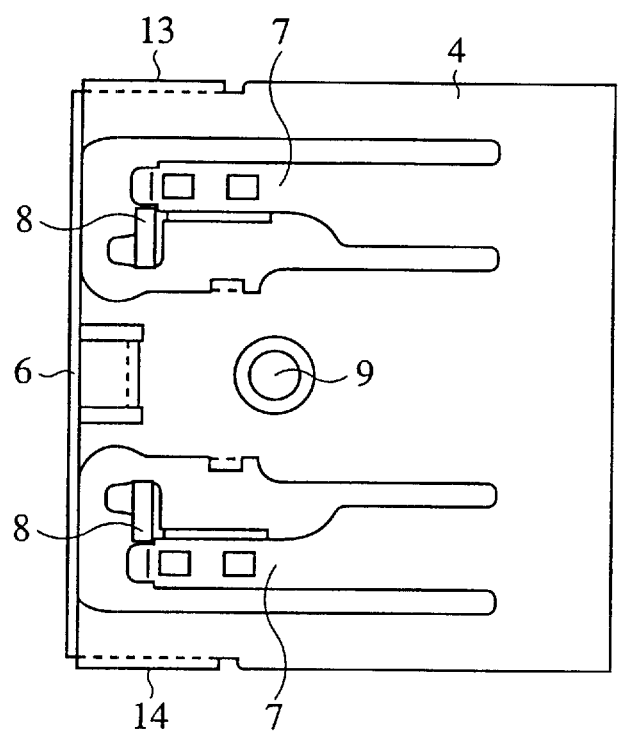
Figure 11:
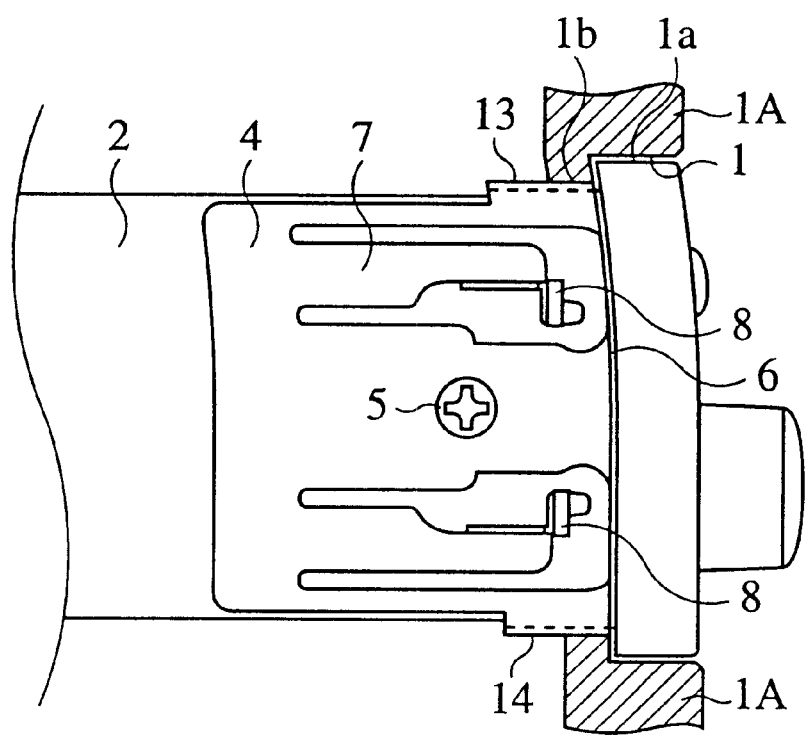
FIG. 11 is a side view in vertical section showing the car audio as load into the audio mounting hole shown in FIG. 8.
Figure 12:
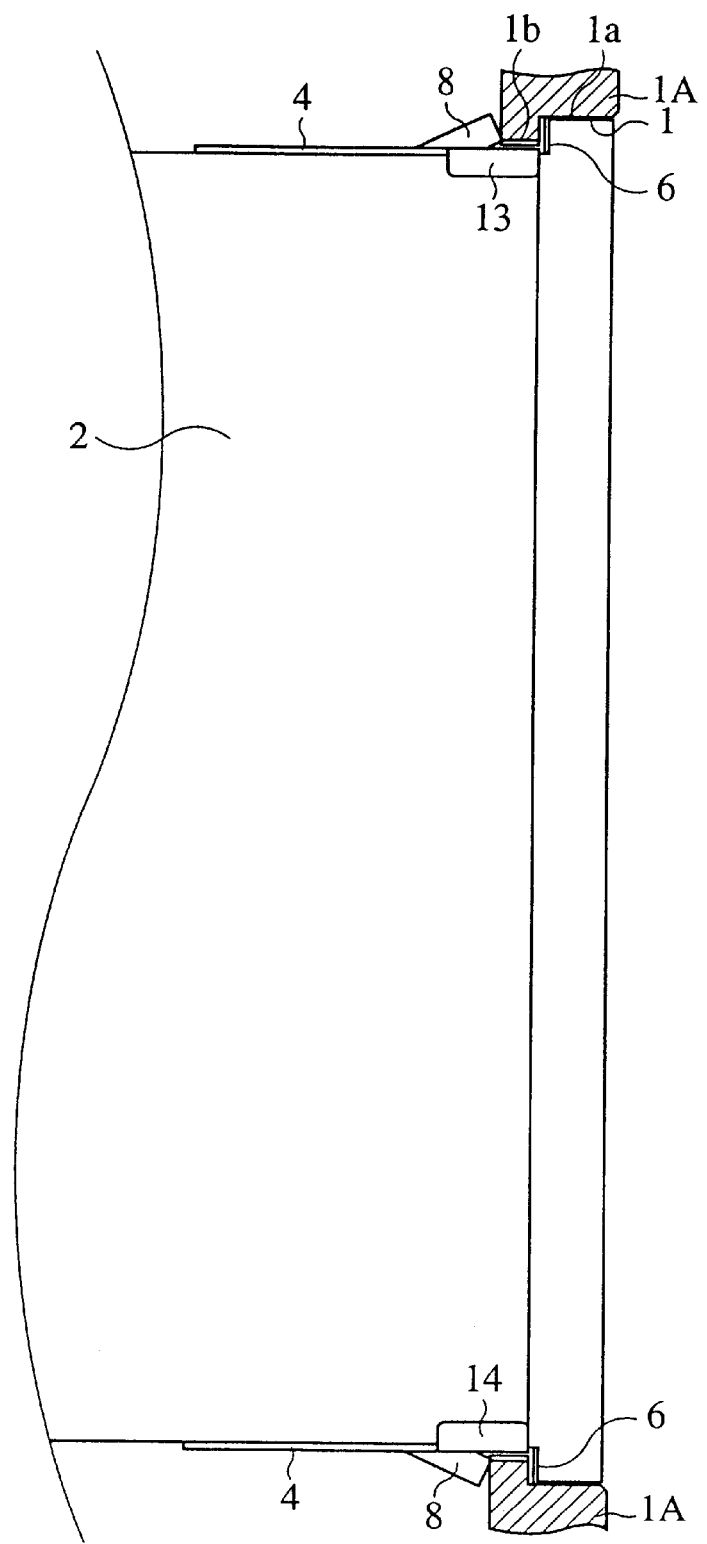
FIG. 12 is a plan view in cross section of FIG. 11.

FIG. 8 is a perspective view showing a car audio in relation to a vehicular audio mounting hole, with a car audio mounting device according to Embodiment 1 of the present invention being attached to the car audio, FIG. 9 is an enlarged perspective view of the car audio shown in FIG. 8, FIG. 10 illustrates the car audio mounting device shown in FIGS. 8 and 9, in which (a) is a side view, (b) is a front end view of (a), and (c) is a top end view of (a), FIG. 11 is a side view in vertical section showing the car audio as loaded into the audio mounting hole shown in FIG. 8, and FIG. 12 is a plan view in cross section of FIG. 11. In these figures, components identical to those in FIGS. 1 to 5 are identified by like reference numerals.

In these figures, the numeral 13 denotes a bent engaging piece for use as an upper end positioning piece formed by bending the front upper end of a plate-like mounting device body 4 in an approximately perpendicular direction, and numeral 14 denotes a bent engaging piece for use as a lower end positioning piece formed by bending the front lower end of the mounting device body 4 nearly at right angles in the same direction as the bent engaging piece 13. Other components of the mounting device body 4 are the same as in FIGS. 1 to 7 and therefore will not be explained here. In FIGS. 8 and 9, the numeral 15 denotes an elastic engaging lug formed of rubber for example and is provided on the rear wall of a chassis 2A of a car audio 2. The elastic engaging lug 15 is fitted and engaged in an engaging hole (not shown) formed in a vehicle body-side chassis positioned at an inner part of an audio mounting hole 1.

With the mounting device body 4 secured to each of both side faces of the car audio chassis 2A of the car audio 2, as shown in FIGS. 8 and 9, the bent engaging piece 13 used as an upper end positioning piece, projects along the upper surface of the car audio 2 (the upper surface of a cover chassis 2C) from the upper end of the mounting device body 4. At the same time, the bent engaging piece 14, used as a lower end positioning piece, projects along the lower surface of the car audio 2 (the lower surface of a case-like chassis 2A) from the lower end of the mounting device body 4.

In the mounting device body 4, the bent upper and lower engaging pieces 13 and 14 are formed so that the outside spacing between the two is almost the same as the vertical opening size of the vehicular audio mounting aperture, i.e., the height of a small-diameter aperture 1b of the hole 1 shown in FIGS. 11 and 12.

The operation of the invention will now be explained.

When the car audio 2 with two mounting device bodies 4 secured to both side faces thereof is fitted in the vehicular audio mounting hole 1, the bent upper and lower engaging pieces 13 and 14 of the mounting device bodies 4 are fitted in the small-diameter opening 1b of the audio mounting hole 1 and abut and match the upper and lower inner wall surfaces of the small-diameter opening 1b, as shown in FIG. 11. As a result, the car audio 2 is positioned and fixed vertically with respect to the audio mounting hole 1.

Thus, the bent upper and lower engaging pieces 13, 14 of the mounting device bodies 4 function as vertical positioning mechanisms which inhibit vertical movements of the car audio 2 as loaded into the audio mounting hole 1.

In this Embodiment 1, bent front-end engaging pieces 6 of the mounting device bodies 4 function as transverse positioning mechanisms which inhibit transverse movements of the car audio 2, In addition, engaging pawls 8 of the mounting device bodies 4 function as inward positioning mechanisms which inhibit an inward movement of the car audio 2.

This is the same as in the prior art described above in connection with FIGS. 1 to 5.

Thus, in the car audio mounting device according to Embodiment 1, the use of a single kind of mounting device body 4, enables the positioning and affixation the car audio 2 vertically, transversely and inwardly with respect to the audio mounting hole 1. As sufficient positioning and fixing strengths are attained in those directions, the car audio mounting accuracy is improved. Furthermore, the bent engaging pieces 13 and 14 for vertical positioning and fixing, the bent front-end engaging piece 6 for transverse positioning and fixing, and the engaging pawl 8 for inward positioning and fixing, are formed by bending a single mounting device body 4. That is to say, as no other separate component is needed, it is possible to reduce the number of components used, simplify the molding process adopted and reduce costs.

Embodiment 3

Figure 13:
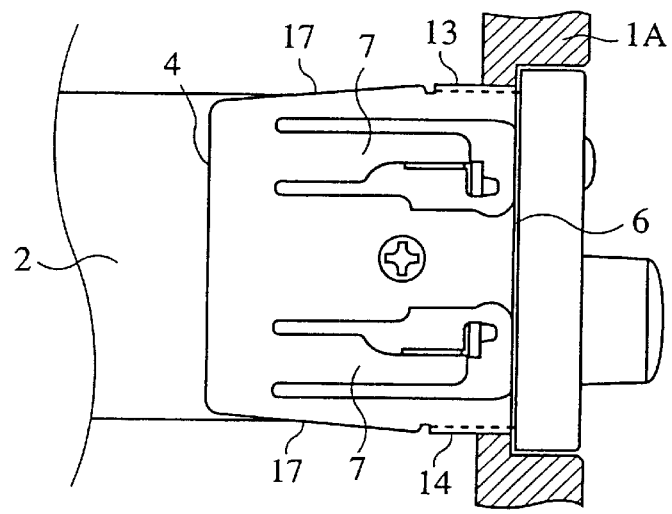
FIG. 13 is a sectional view showing, as mounted, a car audio equipped with a car audio mounting device according to Embodiment 3 of the present invention.

FIG. 13 is a sectional view showing, as mounted, a car audio equipped with a car audio mounting device according to Embodiment 3 of the present invention. In the same figure, numeral 17 denotes a tapered side portion formed on each of upper and lower sides of a mounting device body 4. When a car audio 2 is fitted into an audio mounting hole 1, the upper and lower tapered side portions 17 function as a guide mechanism for guiding the mounting device body 4 vertically in the car audio inserting direction with respect to the audio mounting hole 1.

Thus, according to Embodiment 3, the insertion of the car audio 2 into the audio mounting hole 1 can be done smoothly although bent engaging pieces 13 and 14 for upper and lower positioning and fixing are projected along the upper and lower surfaces of the car audio 2 from the upper and lower ends of the mounting device body 4.

Further, since a mounting device body 4 having tapered side portions 17, can be formed easily by machining only one kind of component and is applicable to different audio systems, design freedom is improved.

Embodiment 4

Figure 14:
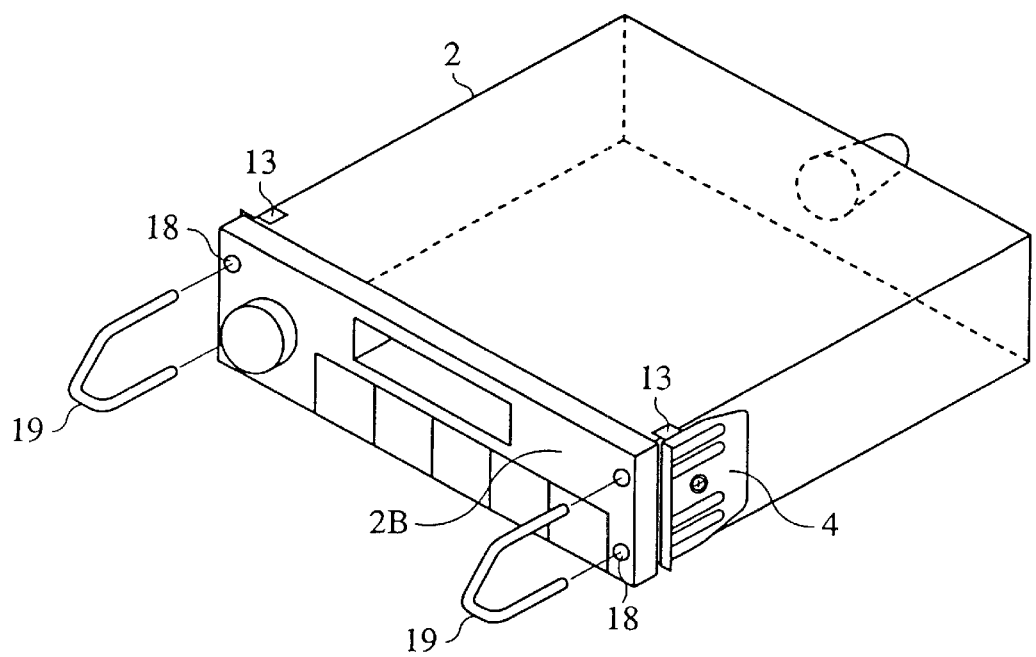
FIG. 14 is a perspective view of a car audio equipped with a car audio mounting device according to Embodiment 4 of the present invention.

FIG. 14 is a perspective view of a car audio equipped with a car audio mounting device according to Embodiment 4 of the present invention. In the figure, the numeral 18 denotes a through hole formed in positions close to both sides of a front operating panel 2B of the car audio 2, and numeral 19 denotes a disengaging pin for insertion into the through hole 18 to disengage the engaging pawl 8 of the mounting device body 4 and the audio mounting hole 1 from each other.

Thus, according to Embodiment 3, when the car audio 2 is loaded and fixed into the audio mounting hole 1, if the engaging pawls 8 engaged with the inner opening ends of the small-diameter opening 1b of the audio mounting hole 1 are deformed elastically by the disengaging pins 19 in the disengaging direction, as shown in FIG. 12, the car audio 2 can be removed easily from the audio mounting hole 1.

INDUSTRIAL APPLICABILITY

As set forth hereinabove, the car audio mounting device according to the present invention is most suitable for the mounting of a car audio because it permits the car audio to be surely positioned and fixed with respect to a vehicular audio mounting hole, using only one kind of component without requiring the use of any other separate component.

What is claimed is:

1. A combination of a car audio and a car audio mounting device for positioning and fixing the car audio into an audio mounting hole formed in a vehicle, the combination comprising:

a car audio;

mounting device bodies fixed respectively to both right and left side faces of the car audio and fitted into the audio mounting hole together with the car audio; and wherein each of the mounting device bodies has (1) a tapered shape that tapers away from a front end of the car audio, and (2) a vertical positioning mechanism, for positioning and fixing the car audio vertically with respect to the audio mounting hole when the car audio is inserted into the audio mounting hole, projecting respectively along upper and lower surfaces of the car audio.

2. The combination according to claim 1, wherein each of the vertical positioning mechanisms includes bent upper and lower engaging pieces for pressure engagement respectively with upper and lower inner wall surfaces of the audio mounting hole upon insertion of the car audio into the audio mounting hole.

3. The combination according to claim 1, wherein the tapered shape of the mounting device bodies guides the mounting device bodies up to a predetermined position with respect to the audio mounting hole when the car audio is inserted into the audio mounting hole.

4. The combination according to claim 3, wherein the mounting device bodies are secured in face-to-face contact to the right and left side faces of the car audio.

* * * * *